April 19, 1960  J. P. JACULA  2,933,188
FILTERS
Filed Jan. 29, 1957
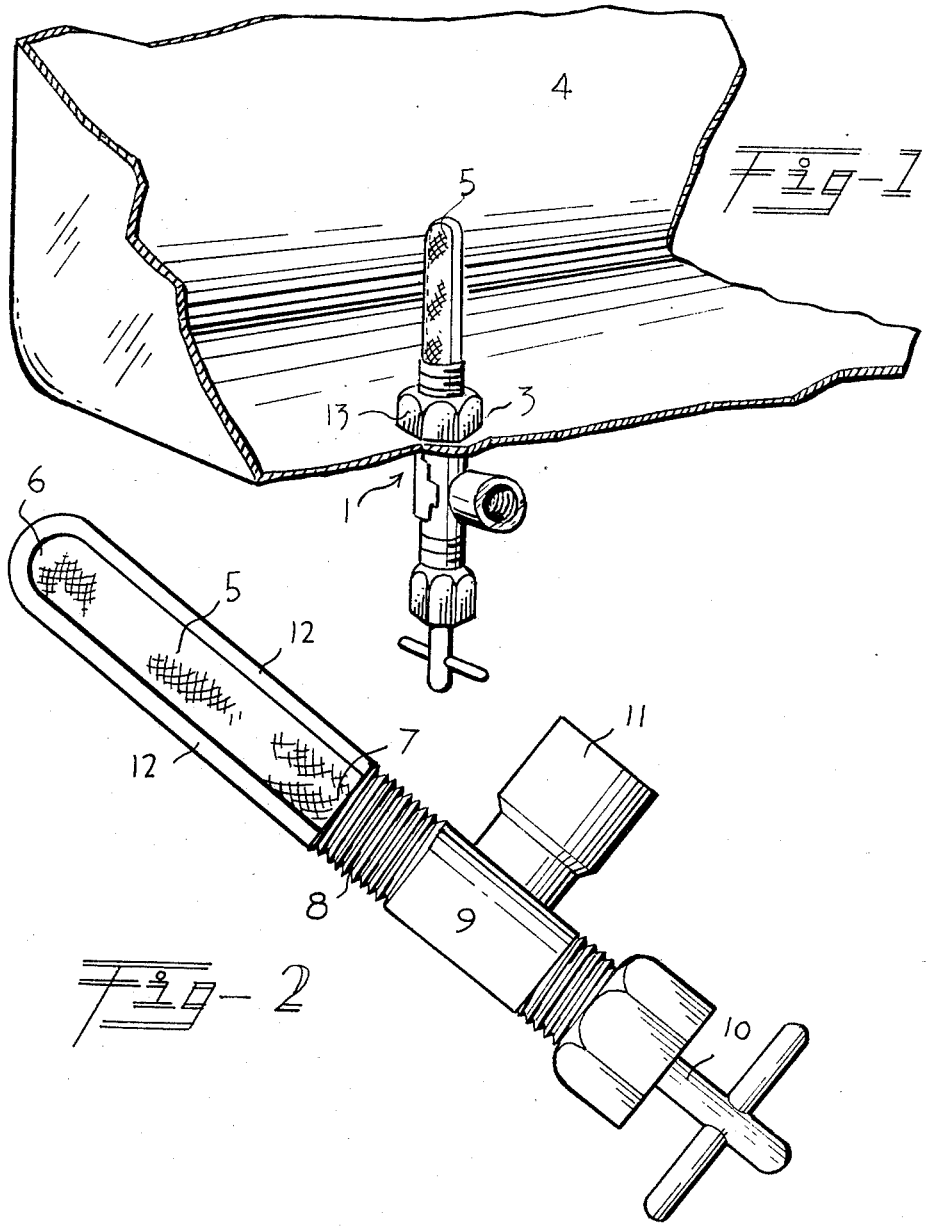
INVENTOR
JOHN P. JACULA
BY Edward Everley Bishop
ATTORNEY

United States Patent Office 2,933,188
Patented Apr. 19, 1960

2,933,188

FILTERS

John P. Jacula, Derwent, Alberta, Canada

Application January 29, 1957, Serial No. 636,981

1 Claim. (Cl. 210—172)

This device is related in general to filters and in particular to an improved filter for a gasoline tank or the like.

The principal object of my invention is to provide a filter of this type whose construction will inhibit material from clinging to the filter to clog the filter and prevent the passage of gasoline therethrough.

An additional object is to provide a filter whose construction will permit the passage of fluid therethrough to aid in unclogging the filter.

A still further object is to provide a filter for a gasoline tank that is attachable to the discharge valve in the tank and that may be removed or replaced at will as desired.

A still further object is to provide a filter having integral strengthening means to maintain the shape of the filter while the filter in in operation.

An additional object is to provide a filter of small mesh that may be positioned within a gasoline tank whereby movement of fluid in the tank under ordinary motion of an automotive vehicle will clean the filter.

Further objects and advantages of my device will be seen from the specification attached hereto when read in the light of the drawings. Obviously the information in the drawings and specification is by way of example and illustration only and should not be construed as a limitation.

In the drawings—

Figure 1 is a broken away isometric view showing the portion of the gasoline tank with my device installed therein.

Figure 2 is an enlarged side elevational view of my device removed from the gasoline tank.

As seen in the drawings by device, referred to generally by the numerial 1, is shown installed at 3 in a gasoline tank 4. As is common in gasoline tanks the attachment point 3 is the discharge opening of the gasoline tank 4 and would be positioned at the lowest point in the bottom of the tank.

The filter comprises the cylindrical screen 5 which is closed at one end 6 and is attached at its opposite end 7 to the intake end 8 of the valve 9. The valve 9 is of common construction and includes a valve stem 10 that may be manipulated manually to close and open the valve and with an outlet 11 at the side of the valve.

Adequate reinforcement for the cylindrical screen 5 is provided by the reinforcing bars 12—12 which extend on opposite sides of the cylindrical screen 5 and are fixed rigidly thereto and in addition are joined at the closed end 6 as is illustrated.

In operation the device is assembled substantially as illustrated and described and is inserted in the bottom of the gasoline tank so that the cylindrical screen 5 will project vertically into the tank and the valve 8 will be engaged threadably in the tank by the nut 13 or like means. The side outlet 11 would be connected to a gas line leading to the combustion engine or like device and, when the valve stem 10 is opened, gasoline would flow through the mesh in the cylindrical screen and along the said line to the engine.

While the automotive vehicle or like device is in operation it will be obvious that any gasoline in the tank would be washed backwardly and forwardly in the tank and it will be obvious that this fluid will wash through the cylindrical screen 5 to wash out any sediment or other foreign material that has been lodged in the mesh of the screen.

I claim:

A filter for a fuel tank having an aperture in the bottom thereof and an external valve having inlet and outlet openings and secured releasably at the said inlet opening in the said aperture, a cylindrical screen open at one end and closed at its opposite end and secured at its open end in the said inlet opening of the valve to project vertically into the said tank, longitudinal reinforcing bars fixed to the screen on opposite sides thereof and joined together at the said closed end of the screen, the diameter of the said cylindrical screen and bars being less than the diameter of the said aperture whereby the cylindrical screen may be removed from the tank with the valve.

References Cited in the file of this patent

UNITED STATES PATENTS

| | | |
|---|---|---|
| 1,261,028 | Houston | Apr. 2, 1918 |
| 1,282,351 | Woodard | Oct. 22, 1918 |
| 1,306,150 | Kessler | June 10, 1919 |
| 1,883,832 | Sundstrand | Oct. 18, 1932 |
| 2,057,779 | Jacobs | Oct. 20, 1936 |
| 2,495,900 | Laws | Jan. 31, 1950 |